United States Patent
Huang et al.

(10) Patent No.: US 9,367,905 B2
(45) Date of Patent: Jun. 14, 2016

(54) METHOD AND SYSTEM OF ENHANCING A BACKLIGHT-SCALED IMAGE

(71) Applicants: National Taiwan University, Taipei (TW); Himax Technologies Limited, Tainan (TW)

(72) Inventors: Tai-Hsiang Huang, Taipei (TW); Kuang-Tsu Shih, Taipei (TW); Su-Ling Yeh, Taipei (TW); Homer H. Chen, Taipei (TW); Sheng-Chun Niu, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 301 days.

(21) Appl. No.: 14/042,712

(22) Filed: Sep. 30, 2013

(65) Prior Publication Data

US 2015/0029205 A1 Jan. 29, 2015

Related U.S. Application Data

(60) Provisional application No. 61/858,562, filed on Jul. 25, 2013.

(51) Int. Cl.
  G06T 5/00 (2006.01)
  G09G 5/10 (2006.01)
  H04N 21/44 (2011.01)
  G06K 9/40 (2006.01)
  G06T 5/50 (2006.01)
  H04N 21/414 (2011.01)
  H04N 21/431 (2011.01)
  H04N 21/443 (2011.01)

(52) U.S. Cl.
  CPC . G06T 5/50 (2013.01); G06T 5/007 (2013.01); G09G 5/10 (2013.01); G09G 2320/0271 (2013.01); G09G 2320/062 (2013.01); G09G 2320/0626 (2013.01); G09G 2320/0646 (2013.01); G09G 2340/02 (2013.01); G09G 2360/144 (2013.01); G09G 2360/16 (2013.01); H04N 21/41407 (2013.01); H04N 21/4318 (2013.01); H04N 21/4436 (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2005/0248524 A1* | 11/2005 | Feng | ..................... | G09G 3/3413 345/102 |
| 2009/0219243 A1* | 9/2009 | Chen | ..................... | G09G 3/3406 345/102 |
| 2009/0232411 A1* | 9/2009 | Chen | ..................... | G09G 3/2007 382/274 |
| 2009/0322800 A1* | 12/2009 | Atkins | ................. | G09G 3/3413 345/690 |
| 2010/0013751 A1* | 1/2010 | Kerofsky | ................ | G09G 3/006 345/89 |
| 2010/0020094 A1* | 1/2010 | Park | ...................... | G09G 3/2055 345/589 |

* cited by examiner

*Primary Examiner* — Wesner Sajous
(74) *Attorney, Agent, or Firm* — Donald E. Stout; Stout, Uxa & Buyan, LLP

(57) ABSTRACT

A method and system of enhancing a backlight-scaled image include a minimum perceptible luminance threshold of cone response with dim backlight being determined, and a luminance layer associated with an image being extracted. The luminance layer is decomposed into an HVS response layer and a background luminance layer for each pixel of the luminance layer. Luminance of dark pixels of the background luminance layer is boosted and compressed to a perceptible range above the minimum perceptible luminance threshold, thereby resulting in an enhanced background luminance layer. An enhanced luminance layer is generated through composition using the HVS response layer and the enhanced background luminance layer as inputs.

24 Claims, 4 Drawing Sheets

METHOD AND SYSTEM OF ENHANCING A BACKLIGHT-SCALED IMAGE

CROSS-REFERENCE TO RELATED APPLICATIONS

The present invention claims the benefit of Provisional Patent Application No. 61/858,562, filed on Jul. 25, 2013, entitled "Enhancement of Backlight-Scaled Images," the entire contents of which are incorporated herein by reference.

BACKGROUND OF THE INVENTION

1. Field of the Invention

The disclosure generally relates to a display with dim backlight, and more particularly to a method and system of enhancing a backlight-scaled image.

2. Description of Related Art

One way of prolonging battery life of hand-held electronic devices such as smart phones is to reduce backlight of a liquid crystal display (LCD), however, at the cost of image quality. Dim backlight usually affects the visual perception of an LCD image in two ways. First, it causes the image details, especially those of the dark regions, less visible or even imperceptible, and is commonly referred to as detail loss effect. Second, it causes color degradation because of the decrease of chrominance intensity. The dimmer the backlight is, the more the color degrades.

Most previous methods for enhancing dimmed images deal with 50% or more LCD backlight. These methods suffer from detail loss and color degradation when being adapted to lesser LCD backlight, for example, 10% or less of full backlight in which the luminance reduces, for example, to be within the range of 0-30 cd/m$^2$.

For the reason that conventional methods could not effectively enhance dimmed images, a need has arisen to propose a novel method of enhancing a backlight-scaled image illuminated with 10% or even 5% of the full backlight such that the battery life could be substantially prolonged without substantively affecting image quality.

SUMMARY OF THE INVENTION

In view of the foregoing, it is an object of the embodiment of the present invention to provide a method and system of enhancing a backlight-scaled image by boosting luminance of image areas below a perceptual threshold while preserving contrast of other image areas. The proposed method and system is carried out in the background luminance layer to avoid luminance gradient reversal and over-compensation. The contrast of the processed image may be further enhanced by exploiting the Craik-O'Brien-Cornsweet visual illusion.

According to one embodiment, a minimum perceptible luminance threshold of cone response with dim backlight is determined, and a luminance layer associated with an image is extracted. The luminance layer is decomposed into an HVS response layer and a background luminance layer for each pixel of the luminance layer. Luminance of dark pixels of the background luminance layer is boosted and compressed to a perceptible range above the minimum perceptible luminance threshold, thereby resulting in an enhanced background luminance layer. An enhanced luminance layer is generated through composition using the HVS response layer and the enhanced background luminance layer as inputs.

DETAILED DESCRIPTION OF THE INVENTION

Figure 1:
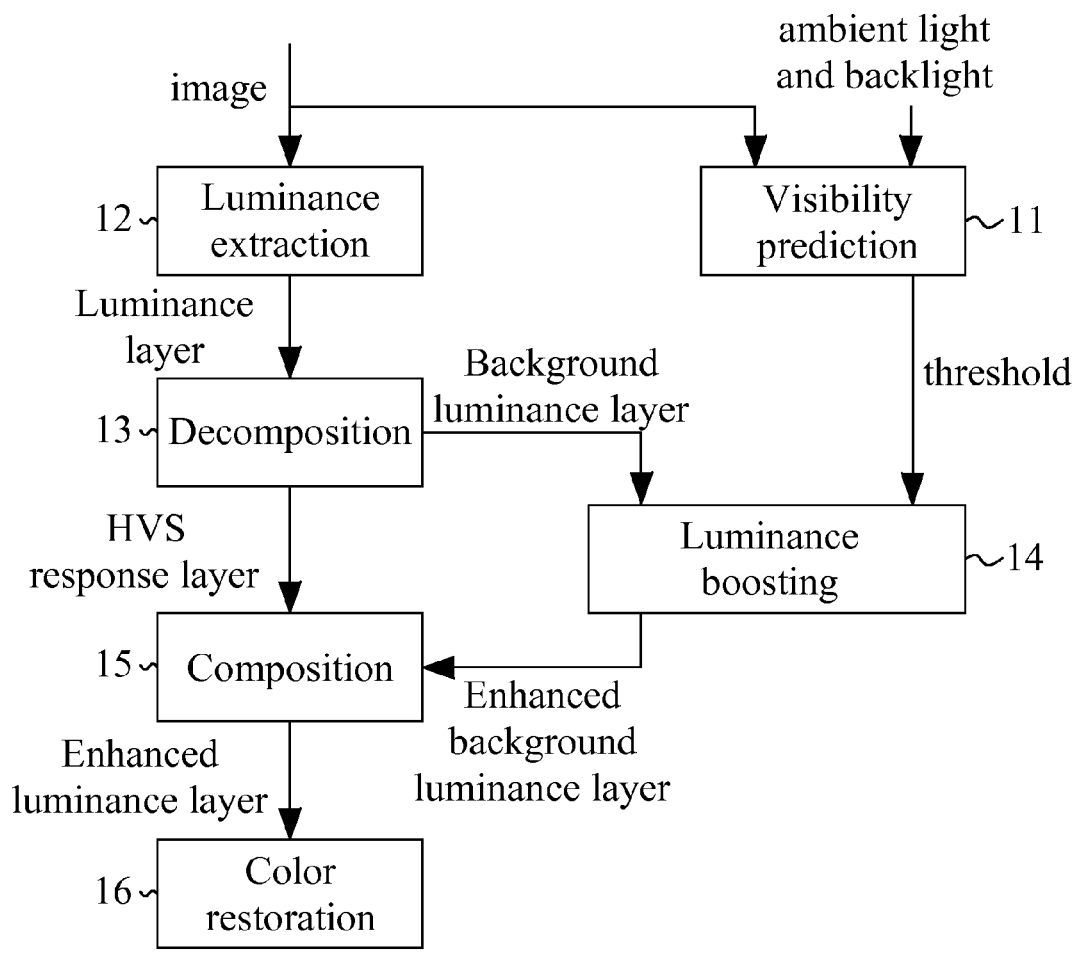
FIG. 1 shows a block diagram illustrating a method and system of enhancing a backlight-scaled image according to one embodiment of the present invention.

FIG. 1 shows a block diagram illustrating a method and system of enhancing a backlight-scaled image according to one embodiment of the present invention. A perception-based approach that takes the property of human visual system (HVS) into consideration is adopted in the embodiment. The embodiment may be adapted to a display, such as a liquid crystal display (LCD), and the following blocks or steps to be described may be performed by a processor, such as a digital image processor.

In block 11, visibility prediction is performed, for example, by a visibility prediction unit, to determine a minimum perceptible luminance threshold of cone response (i.e., the response of human cone cells to luminance) with dim backlight. Below the minimum perceptible luminance threshold, detail of an image becomes invisible, therefore resulting in detail loss. In the illustrated embodiment, the dim backlight may be, but not necessarily, 10% or less of full backlight.

The visibility prediction of the embodiment is modeled, with modifications, based on Huang et al.'s visibility model, details of which may be referred to "A visibility model for quality assessment of dimmed images," entitled to Huang et al., Proc. 4th IEEE Int. Workshop Multimedia Signal Process., pp. 206-211, Banff, Canada, September 2012, the disclosure of which is incorporated herein by reference. Generally speaking, inputs of Huang's visibility model are an image, a backlight intensity level, and an ambient light intensity level, and an output of the model is a map that represents probability of visibility of each pixel in the input image. The embodiment, however, obtains probability $P_L$ that a pixel is visible when illuminated with the full backlight but is invisible when illuminated with the dim backlight. Specifically, $$P_L = P_L^F (1 - P_L^D) \qquad (1)$$

where $P_L^F$ and $P_L^D$, respectively, are probabilities of visibility for the pixel when the backlight is at full and dim level. In this case, the threshold value for $P_L$ can be reasonably set to 0.5 as it indicates that 50% of viewers are expected to see the detail loss effect.

In block 12, luminance extraction is performed, for example, by a luminance extraction unit, to construct an HVS response function based on an HVS response model, according to which a luminance layer associated with the input image may thus be obtained. As our perceptual response to an image is a nonlinear function of the image luminance, the HVS response model may characterize this nonlinear behavior by taking the luminance value as an input and converting it to a nonnegative integer as an output such that a difference of 1 in the output corresponds to a just noticeable difference (JND) in luminance. The JND is the smallest difference in the sensory input that is discernible by human being. To be specific, given a background luminance L and the corresponding just noticeable difference ΔL, the HVS cannot detect a foreground stimulus if its luminance value is between L−ΔL and L+ΔL. The embodiment adopts a JND model proposed by Iranli et al. for low dynamic range of luminance to describe the relation between L and ΔL by $$\Delta L = J(L) = 0.0594(1.219 + L^{0.4})^{2.5} \quad (2)$$

where J(•) is a function that returns the JND of a given luminance. Details of Iranli et al.'s JND model may be referred to "HVS-aware dynamic backlight scaling in TFT-LCDs," entitled to Iranli et al., IEEE Trans. Very Large Scale Integration Syst., vol. 14, pp. 1103-1116, October 2006, the disclosure of which is incorporated herein by reference.

To realize this HVS response model for practical use, one may compute $L_1 = L_0 + J(L_0)$, where $L_0$ denotes a lower bound of the luminance range under consideration, and continue the recursive procedure until $L_i$ reaches an upper bound of the luminance range $$L_i = L_{i-1} + J(L_{i-1}), i > 0 \quad (3)$$

where i is an integer and J(•) is defined in (2).

The HVS response model models the response of HVS to a foreground luminance $L_F$ given a background luminance $L_B$. In one example, the pixel at the center of the image is considered as foreground, and the remaining pixels of the image as background. The background luminance may be defined to be the weighted average of the luminance values of the background pixels.

Figure 2:
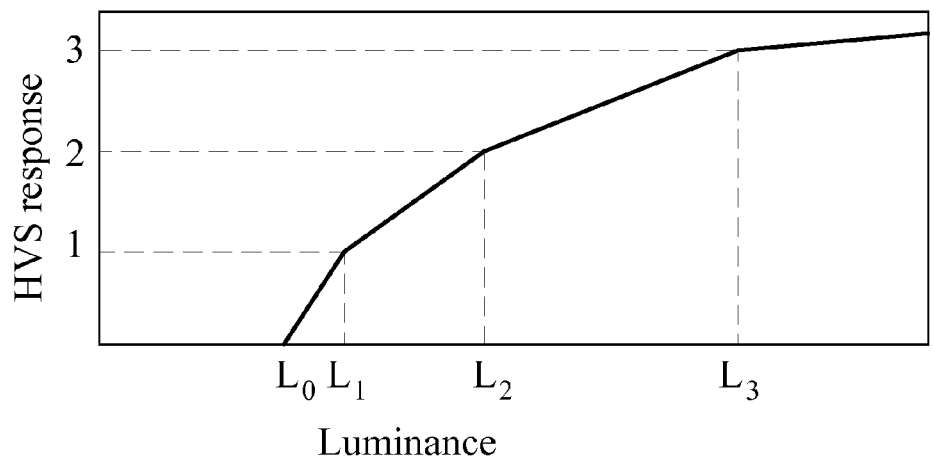
FIG. 2 shows a piecewise linear interpolated HVS response curve.

The HVS response function, therefore, may be denoted by $f(L_F, L_B)$. When both $L_F$ and $L_B$ are equal to $L_0$, we have $f(L_0, L_0)=0$ because one cannot perceive the foreground when it has the same luminance as the background. We also have $f(L_1, L_0)=1$, $f(L_2, L_0)=2$, and so on because increasing or decreasing the HVS response value by one unit results in a just noticeable change of luminance. Based on the HVS response for some discrete foreground luminance values $L_0$, $L_1$, $L_2$, etc., the HVS response function may be made continuous by linear interpolation, as exemplified in FIG. 2.

Subsequently, in block 13, decomposition (e.g., JND decomposition) is performed, for example, by a decomposition unit, to divide the luminance layer into an HVS response layer (i.e., $f(L_F, L_B)$) and a background luminance layer (i.e., $L_B$) for each pixel of the luminance layer.

Figure 3:
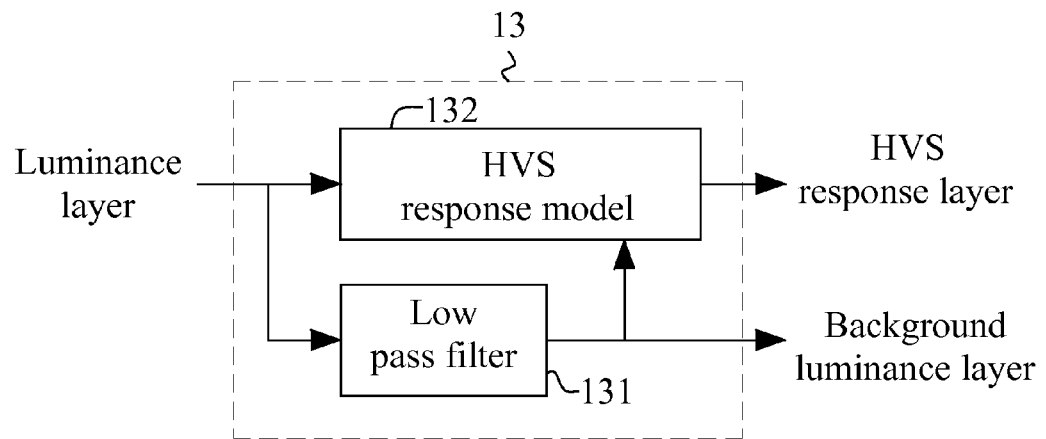
FIG. 3 shows a block diagram illustrative of the JND decomposition of block 13 in FIG. 1.

FIG. 3 shows a block diagram illustrative of the decomposition of block 13 in FIG. 1. Specifically, the background luminance layer may be obtained by low-passing the luminance layer via a low pass filter 131, and the HVS response layer may be obtained from the luminance layer according to the HVS response model 132 and the background luminance layer. Alternatively, the background luminance layer may be obtained by low-passing the luminance layer via a low pass filter 131, and the HVS response layer may be obtained by subtracting the background luminance layer from the luminance layer.

Figure 4:
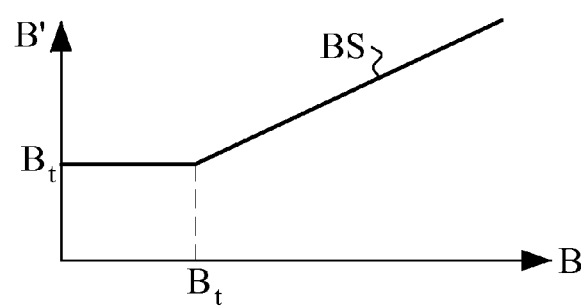
FIG. 4 shows an exemplary enhanced background luminance curve.

In block 14, luminance of dark pixels of the background luminance layer are boosted, for example, by a luminance boosting unit, to a perceptible range (above the minimum perceptible luminance threshold), thereby resulting in an enhanced background luminance layer. Specifically, the background luminance layer is boosted and compressed as follows:

$$B' = \begin{cases} BS, & BS \geq B_t \\ B_t, & \text{otherwise} \end{cases} \quad (4)$$

where B and B', respectively, are input and output background luminance, S is a dimming factor of a display, and $B_t$ is a luminance value of the darkest pixel in the visible regions predicted by Huang et al.'s visibility model. FIG. 4 shows an exemplary enhanced background luminance curve. In the specification, dark pixels are referred to pixels having luminance below a predetermined value, and bright pixels are referred to pixels having luminance above or equal to the predetermined value.

Afterwards, in block 15, an enhanced luminance layer is generated, for example, by a composition unit, through composition (which is an inverse process of the decomposition in block 13), such as JND composition, using the enhanced background luminance layer and the (unaltered) HVS response layer as the inputs.

Figure 5:
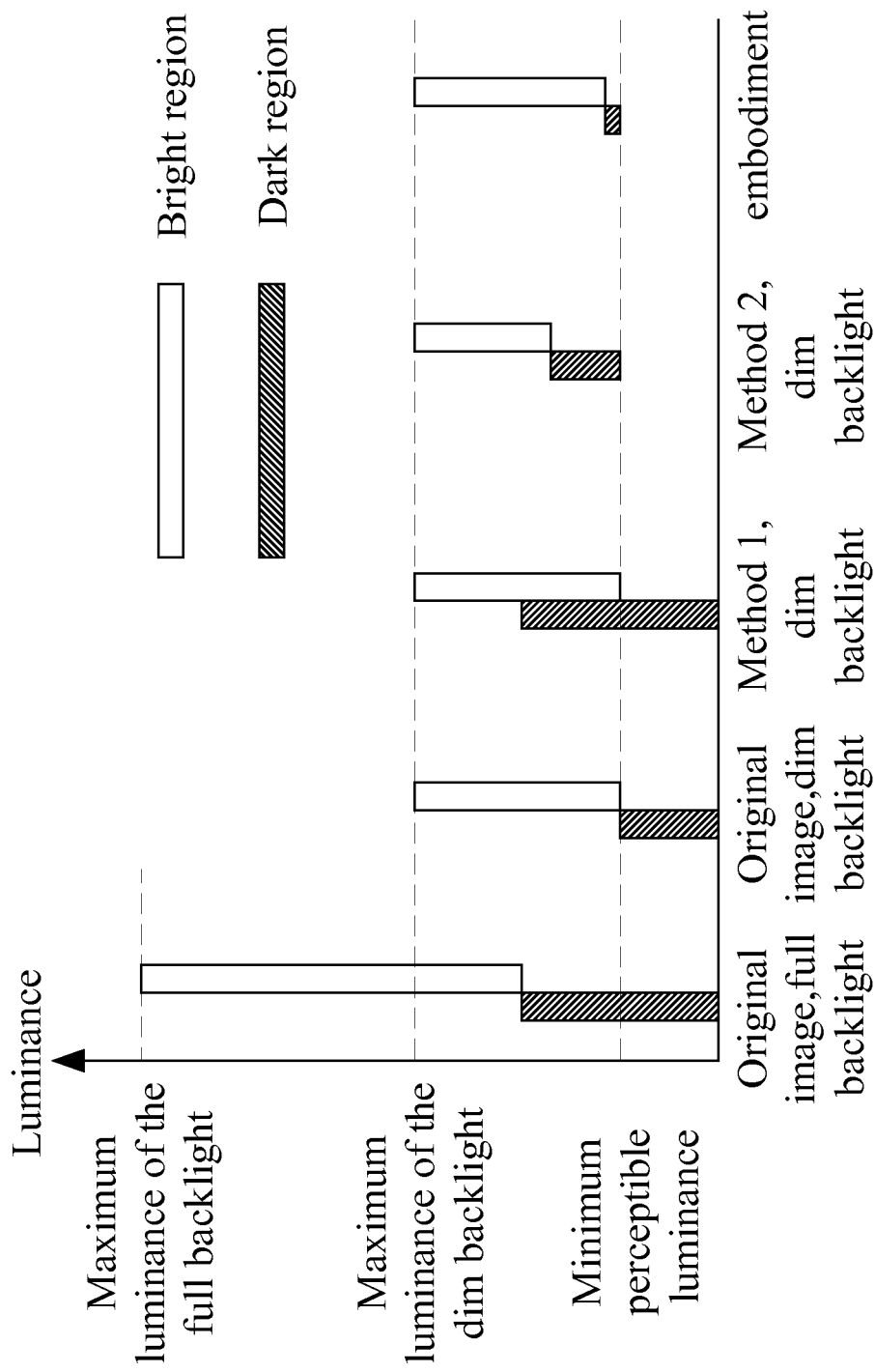
FIG. 5 shows luminance ranges of dark and bright image regions illustrating comparison among some methods and the embodiment.

FIG. 5 shows luminance ranges of dark and bright image regions illustrating comparison among some methods and the embodiment. Method 1 boosts the dark region in such a way that the resulting luminance range of the boosted dark region is equal to its luminance range at 100% backlight. Although part of the dark region becomes visible, this method has two obvious drawbacks. First, the dark region is only partially visible because a portion of the dark region is still below the minimum perceptible level. Second, as a consequence of the fact that the resulting luminance range of the dark region overlaps with that of the bright region, this method introduces luminance gradient reversal.

On the other hand, method 2 proportionally scales the luminance of the entire image to fit within the maximum and minimum luminance levels such that the resulting image is completely perceptible. Although the dark region becomes visible, the boosting operation degrades the perceptual contrast of the bright region—an undesirable effect since the HVS is sensitive to contrast.

According to the embodiment discussed above, the luminance of the image is reallocated to the perceptible luminance range as Method 2, but the bright and dark regions are processed with different scaling and boosting factors. To preserve the perceptual contrast of the bright region, its luminance is reallocated to a luminance range slightly smaller than the perceptible luminance range. In the meanwhile, to enhance the perceptual contrast of the dark region, the luminance of the dark region is compressed to a small range and boosted above the minimum perceptible level. This way, the enhancement of the dark region is achieved at only a slight cost of the luminance range of the bright region. Hence, the effect on the perceptual contrast of the bright region is very small. In other words, the embodiment trades only a small portion of the perceptible luminance of the bright region for a significant improvement of picture quality for the dark region.

Figure 6:
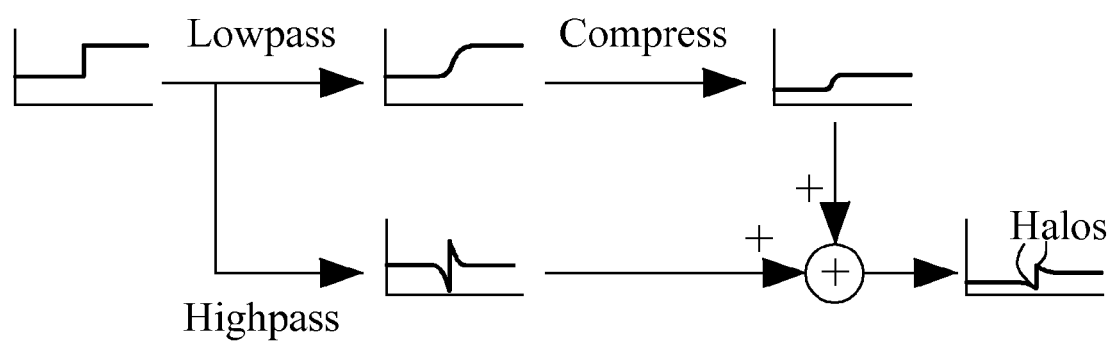
FIG. 6 demonstrates how compression would lead to luminance reversal phenomenon that gives rise to halo effect.

As compression has been performed in block 14, luminance (gradient) reversal phenomenon may occur, particularly at the edge of an object, to give rise to halo effect. Specifically, as exemplified in FIG. 6, the aforementioned HVS response layer is a high-passed signal because the perceptual contrast recorded in this layer is mainly contributed by the high frequency components of the image, and the aforementioned background luminance layer is a low-passed signal since it is obtained by averaging the luminance of a block of neighboring pixels. After the background luminance layer is compressed, spikes in the high-passed signal results in the halos in an output signal as shown. A bilateral filter may be applied, in the averaging operation in the computation of the background luminance layer (block 14), to compensate for the halo effect (or counter shading). Filter weights (or coefficients) of the applied bilateral filter may be determined according to relative pixel intensities. Specifically speaking, pixels that are more different from a central pixel in intensity may have less weight, and vice versa.

However, too much counter shading may lead to magnification of the perceived contrast, a visual phenomenon called the Craik-O'Brien-Cornsweet illusion. To have a proper control, a bilateral filter is adopted in the computation of background luminance layer and the degree of edge preserving is controlled by adjusting the variance of the intensity kernel of the bilateral filter.

As blocks or steps discussed so far are performed on the luminance values of the image, color restoration is thus necessarily performed, in block 16, on every pixel for each color channel in the enhanced luminance layer to obtain an enhanced color image, for example, by a color restoration unit. Denote the enhanced luminance layer image by $L_e$. Then, the enhanced color image is obtained by $$M_e = M_o \left(\frac{L_e}{L_o}\right)^{\frac{1}{\gamma}} \quad (5)$$

where $L_o$ is an luminance value of the original image, $\gamma$ is the gamma parameter of a display, and $M_o$ and $M_e$, respectively, are original and enhanced pixel values of a color channel.

Although specific embodiments have been illustrated and described, it will be appreciated by those skilled in the art that various modifications may be made without departing from the scope of the present invention, which is intended to be limited solely by the appended claims.

What is claimed is:

1. A method of enhancing a backlight-scaled image, comprising a digital image processor for performing the following steps:
   using a visibility prediction unit of the digital image processor to determine a minimum perceptible luminance threshold of cone response with dim backlight;
   using a luminance extraction unit of the digital image processor to extract a luminance layer associated with an image;
   using a decomposition unit of the digital image processor to decompose the luminance layer into a human visual system (HVS) response layer and a background luminance layer for each pixel of the luminance layer;
   using a luminance boosting unit of the digital image processor to boost and compress luminance of dark pixels of the background luminance layer to a perceptible range above the minimum perceptible luminance threshold, thereby resulting in an enhanced background luminance layer;
   using a composition unit of the digital image processor to generate an enhanced luminance layer through composition using the HVS response layer and the enhanced background luminance layer as inputs; and
   displaying an image on an imaging device;
   wherein the minimum perceptible luminance threshold is determined by performing visibility prediction based on a visibility model, inputs of which are an image, a backlight intensity level, and an ambient light intensity level.

2. The method of claim 1, wherein an output of the visibility model represents a probability that a pixel is visible when illuminated with full backlight but is invisible when illuminated with the dim backlight.

3. The method of claim 1, wherein the luminance layer is extracted based on a human visual system (HVS) response model.

4. The method of claim 3, wherein the HVS response model is characterized by taking luminance value as an input and converting it to a nonnegative integer as an output such that a difference of 1 in the output corresponds to a just noticeable difference (JND) in luminance.

5. The method of claim 3, wherein the background luminance layer is obtained by low-passing the luminance layer, and the HVS response layer is obtained from the luminance layer according to the HVS response model and the background luminance layer.

6. The method of claim 3, wherein the background luminance layer is obtained by low-passing the luminance layer, and the HVS response layer is obtained by subtracting the background luminance layer from the luminance layer.

7. The method of claim 1, wherein the background luminance layer is boosted and compressed as follows:

$$B' = \begin{cases} BS, & BS \geq B_t, \\ B_t, & \text{otherwise} \end{cases}$$

where B and B', respectively, are input and output background luminance, S is a dimming factor of a display, and $B_t$ is a luminance value of a predetermined darkest pixel in visible regions predicted by the visibility model.

8. The method of claim 1, wherein the composition is an inverse process of the decomposition.

9. The method of claim 1, in the boosting and compressing step, a bilateral filter is applied.

10. The method of claim 9, wherein filter weights of the applied bilateral filter are determined according to relative pixel intensities.

11. The method of claim 10, wherein pixels that are more different from a central pixel in intensity have less weight.

12. The method of claim 1, further comprising:
    performing color restoration on every pixel for each color channel in the enhanced luminance layer to obtain an enhanced color image.

13. A system of enhancing a backlight-scaled image, comprising:
    a visibility prediction unit configured to determine a minimum perceptible luminance threshold of cone response with dim backlight;
    a luminance extraction unit configured to extract a luminance layer associated with an image;
    a decomposition unit configured to decompose the luminance layer into a human visual system (HVS) response layer and a background luminance layer for each pixel of the luminance layer;
    a luminance boosting unit configured to boost and compress luminance of dark pixels of the background luminance layer to a perceptible range above the minimum perceptible luminance threshold, thereby resulting in an enhanced background luminance layer; and
    a composition unit configured to generate an enhanced luminance layer through composition using the HVS response layer and the enhanced background luminance layer as inputs;
    wherein the minimum perceptible luminance threshold is determined by performing visibility prediction based on a visibility model, inputs of which are an image, a backlight intensity level, and an ambient light intensity level.

14. The system of claim 13, wherein an output of the visibility model represents a probability that a pixel is visible when illuminated with full backlight but is invisible when illuminated with the dim backlight.

15. The system of claim 13, wherein the luminance layer is extracted based on a human visual system (HVS) response model.

16. The system of claim 15, wherein the HVS response model is characterized by taking luminance value as an input and converting it to a nonnegative integer as an output such that a difference of 1 in the output corresponds to a just noticeable difference (JND) in luminance.

17. The system of claim 15, wherein the background luminance layer is obtained by low-passing the luminance layer, and the HVS response layer is obtained from the luminance layer according to the HVS response model and the background luminance layer.

18. The system of claim 15, wherein the background luminance layer is obtained by low-passing the luminance layer, and the HVS response layer is obtained by subtracting the background luminance layer from the luminance layer.

19. The system of claim 13, wherein the background luminance layer is boosted and compressed as follows:

$$B' = \begin{cases} BS, & BS \geq B_t, \\ B_t, & \text{otherwise} \end{cases}$$

where B and B', respectively, are input and output background luminance, S is a dimming factor of a display, and $B_t$ is a luminance value of a predetermined darkest pixel in visible regions predicted by the visibility model.

20. The system of claim 13, wherein the composition is an inverse process of the decomposition.

21. The system of claim 13, wherein the luminance boosting unit comprises a bilateral filter.

22. The system of claim 21, wherein filter weights of the applied bilateral filter are determined according to relative pixel intensities.

23. The system of claim 22, wherein pixels that are more different from a central pixel in intensity have less weight.

24. The system of claim 13, further comprising a color restoration unit configured to perform color restoration on every pixel for each color channel in the enhanced luminance layer to obtain an enhanced color image.

\* \* \* \* \*